(12) United States Patent
Mishima

(10) Patent No.: US 10,397,564 B2
(45) Date of Patent: Aug. 27, 2019

(54) IMAGE MONITORING APPARATUS, IMAGE DISPLAY SYSTEM, AND VEHICLE

(71) Applicant: Rohm Co., Ltd., Kyoto (JP)

(72) Inventor: Kazuma Mishima, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 141 days.

(21) Appl. No.: 15/596,230

(22) Filed: May 16, 2017

(65) Prior Publication Data
US 2017/0339401 A1    Nov. 23, 2017

(30) Foreign Application Priority Data
May 20, 2016   (JP) ................. 2016-101150

(51) Int. Cl.
| | | |
|---|---|---|
| H04N 17/00 | (2006.01) | |
| B60R 1/00 | (2006.01) | |
| B60K 35/00 | (2006.01) | |
| G06T 7/00 | (2017.01) | |
| H04N 5/357 | (2011.01) | |
| H04N 7/18 | (2006.01) | |
| H04N 9/04 | (2006.01) | |

(52) U.S. Cl.
CPC ........... *H04N 17/002* (2013.01); *B60K 35/00* (2013.01); *B60R 1/00* (2013.01); *G06T 7/0004* (2013.01); *H04N 5/357* (2013.01); *H04N 7/18* (2013.01); *H04N 7/181* (2013.01); *H04N 9/045* (2013.01); *B60K 2350/106* (2013.01); *B60K 2350/1088* (2013.01); *B60K 2350/2013* (2013.01); *B60R 2300/207* (2013.01); *B60R 2300/8026* (2013.01); *G06T 2207/10024* (2013.01); *G06T 2207/30168* (2013.01)

(58) Field of Classification Search
CPC ...... H04N 17/002; H04N 7/181; H04N 9/045; H04N 7/18; H04N 5/357; G06T 7/0004; G06T 2207/30168; G06T 2207/10024; G06F 3/16; B60R 2300/8026; B60R 1/00; B60R 2300/207; B60K 2350/2013; B60K 2350/106; B60K 35/00; B60K 2350/1088
See application file for complete search history.

(56) References Cited

U.S. PATENT DOCUMENTS

| | | | | |
|---|---|---|---|---|
| 6,954,818 B2 * | 10/2005 | Kent | ................... | G06F 13/4027 710/306 |
| 7,164,117 B2 * | 1/2007 | Breed | ............... | B60R 21/01516 250/208.1 |
| 7,199,834 B2 * | 4/2007 | Fujii | ..................... | H04N 5/10 348/497 |
| 7,733,999 B2 * | 6/2010 | Mateosky | ............... | H03L 7/093 327/2 |

(Continued)

FOREIGN PATENT DOCUMENTS

JP    2009-111546    5/2009

*Primary Examiner* — Sathyanaraya V Perungavoor
*Assistant Examiner* — Philip P. Dang
(74) *Attorney, Agent, or Firm* — Fish & Richardson P.C.

(57) ABSTRACT

An image monitoring apparatus, includes: an abnormality detecting part configured to detect an abnormal output from an imaging device based on frame data input to a display driving device that displays the frame data output from the imaging device on a display device; and a signal output part configured to output an abnormality detection signal when the abnormal output is detected.

16 Claims, 8 Drawing Sheets

(56) References Cited

U.S. PATENT DOCUMENTS

| | | | |
|---|---|---|---|
| 7,738,480 B2* | 6/2010 | Iwamura | H04B 3/542 340/310.11 |
| 7,929,175 B2* | 4/2011 | Ishii | H04N 1/2369 358/1.16 |
| 8,018,490 B2* | 9/2011 | Yuasa | B60R 1/00 348/148 |
| 8,035,746 B2* | 10/2011 | Cai | H04N 9/896 348/572 |
| 8,199,190 B2* | 6/2012 | Tanaka | G06F 9/4831 348/370 |
| 8,199,208 B2* | 6/2012 | Katsumata | G06K 9/00315 340/5.53 |
| 8,509,564 B2* | 8/2013 | Yamaji | G06T 11/60 382/173 |
| 8,532,345 B2* | 9/2013 | Uchiyama | G06K 9/00604 382/118 |
| 8,634,696 B2* | 1/2014 | Mitsuhashi | G11B 27/105 386/219 |
| 8,938,154 B2* | 1/2015 | Sambongi | H04N 5/772 386/242 |
| 9,092,981 B2* | 7/2015 | Suzuki | G08G 1/096775 |
| 9,201,055 B2* | 12/2015 | Ohnuma | G01N 21/251 |
| 2003/0186646 A1* | 10/2003 | Shibata | H04N 5/21 455/3.01 |
| 2008/0165252 A1* | 7/2008 | Kamimura | H04N 7/181 348/155 |
| 2012/0154590 A1* | 6/2012 | Watanabe | B60R 1/00 348/148 |
| 2013/0235175 A1* | 9/2013 | Kazama | H04N 7/18 348/65 |
| 2015/0271484 A1* | 9/2015 | Kawata | H04N 17/002 348/187 |
| 2016/0092452 A1* | 3/2016 | Wang | G06F 16/2477 707/752 |

* cited by examiner

IMAGE MONITORING APPARATUS, IMAGE DISPLAY SYSTEM, AND VEHICLE

CROSS-REFERENCE TO RELATED APPLICATION

This application is based upon and claims the benefit of priority from Japanese Patent Application No. 2016-101150, filed on May 20, 2016, the entire contents of which are incorporated herein by reference.

TECHNICAL FIELD

The present disclosure relates to an image monitoring apparatus.

BACKGROUND

Recently, an image display system, instead of a back mirror and a side mirror, of vehicles has been developed. In the image display system, an image obtained by imaging a rear of a vehicle by an imaging device is displayed on a monitor. A driver of the vehicle can recognize the situations on the rear of the center, the rear of the left, and the rear of the right of the vehicle by viewing a display of the monitor.

Further, as an example of a related art of the present disclosure, an imaging device is disclosed that detects a presence or an absence of a failure in a logic circuit that processes an image signal input from an imaging element. In such an imaging device, when a failure in the logic circuit is detected, the operation of the imaging device is stopped.

However, when an abnormal output from the imaging device occurs while the situation on the rear of the vehicle is viewed through the image of the monitor, there is a possibility that the driver of the vehicle may not drive the vehicle properly, causing an accident. For example, when a normal image signal is not input to the monitor, since the monitor cannot display an image of the rear of the vehicle, the driver cannot recognize the situation at the rear of the vehicle. In addition, when a portion of an imaging range of the imaging device is not imaged normally, a driver's visible range of display of the monitor is narrowed and the situation in the invisible range cannot be recognized. Moreover, when the imaging of the imaging device is stopped and the monitor can only display a still image before the stop of the imaging device, the driver may not know that the display of the monitor is a still image, and may not recognize that the imaging by the imaging device was stopped. In this case, the driver cannot recognize the situation at the rear of the vehicle and mistakenly recognizes the situation immediately before the imaging was stopped as the situation at the rear of the vehicle at the present time. This may lead to an accident resulting from misjudgment of the driver. In response to such problem, in the above related art, when power is turned on or off, only the presence or absence of a failure may be detected when invalid data of an image signal is output, and a configuration of the imaging device is complicated.

SUMMARY

The present disclosure provides some embodiments of an image monitoring apparatus, an image display system, and a vehicle, which are capable of reducing or preventing misjudgment resulting from an abnormal output from an imaging device.

According to one embodiment of the present disclosure, there is provided an image monitoring apparatus, including: an abnormality detecting part configured to detect an abnormal output from an imaging device based on frame data input to a display driving device that displays the frame data output from the imaging device on a display device; and a signal output part configured to output an abnormality detection signal when the abnormal output is detected (a first configuration).

In the apparatus having the first configuration, the abnormality detecting part may include a signal determining part configured to determine whether the frame data conforms to a format standard of the frame data to detect the abnormal output when the frame data does not conform to the standard (a second configuration).

In the apparatus having the first or second configuration, the abnormality detecting part may include a defective image determining part configured to detect the abnormal output based on a brightness histogram of the frame data output from the imaging device (a third configuration).

In the apparatus having any one of the first to third configurations, the abnormality detecting part may include an image stop determining part configured to determine whether the output of the frame data in the imaging device is stopped based on first frame data output from the imaging device at a first time and second frame data output from the imaging device at a second time after a predetermined period of time from the first time to detect the abnormal output when the output is stopped (a fourth configuration).

In the apparatus having the first configuration, the abnormality detecting part may include at least two of a signal determining part, a defective image determining part, and an image stop determining part. The signal determining part may be configured to detect the abnormal output when the frame data does not conform to a format standard of the frame data, the defective image determining part may be configured to detect the abnormal output based on a brightness histogram of the frame data, the image stop determining part may be configured to determine whether the output of the frame data in the imaging device is stopped based on first frame data output from the imaging device at a first time and second frame data output from the imaging device at a second time after a predetermined period of time from the first time to detect the abnormal output when the output is stopped, a priority may be set in each processing in the at least two of the determining parts, and, when the abnormal output is detected by a first determining part in the at least two of the determining parts, the processing by a second determining part having a priority lower than that of the first determining part may not be performed (a fifth configuration).

In the apparatus having the fourth or fifth configuration, the image stop determining part may include: a calculation part configured to calculate a brightness difference with respect to each color of each pixel of the first frame data and the second frame data; and a brightness difference determining part configured to determine that the output of the frame data is stopped when all the brightness differences with respect to colors are within a predetermined level (a sixth configuration).

In the apparatus having the sixth configuration, the calculation part may be configured to calculate a brightness difference with respect to each color of each pixel within a partial region of the first frame data and the second frame data (a seventh configuration).

In the apparatus having any one of the fifth to seventh configurations, the image stop determining part may further include a thinning part configured to perform a process of thinning on data of pixel rows arranged in a horizontal direction of the first frame data and the second frame data in the unit of a predetermined number of rows at an interval of predetermined rows, and the calculation part may be configured to calculate a brightness difference with respect to each color of each pixel of the first frame data and the second frame data after the process of thinning is performed (eighth configuration).

According to another embodiment of the present disclosure, there is provided an image display system, including: an imaging device; a display driving device configured to display frame data output from the imaging device on a display device; and the imaging monitoring device having any one of the first to eighth configurations, configured to detect an abnormal output from the imaging device based on the frame data input to the display driving device to output an abnormality detection signal (ninth configuration).

According to yet another embodiment of the present disclosure, there is provided a vehicle, including: an imaging device; a display driving device configured to display frame data output from the imaging device on a display device; and the imaging monitoring apparatus having any one of the first to eighth configurations, configured to detect an abnormal output from the imaging device based on the frame data input to the display driving device to output an abnormality detection signal, wherein the imaging device may be configured to image at least one of a central rear, a left rear, and a right rear of the vehicle (tenth configuration).

The vehicle having the tenth configuration may further include a display device configured to perform a predetermined display operation based on the abnormality detection signal (eleventh configuration).

The vehicle having the tenth or eleventh configuration may further include a sound output device configured to output a predetermined sound based on the abnormality detection signal (twelfth configuration).

DETAILED DESCRIPTION

Embodiments of the present disclosure will now be described in detail with reference to the drawings.

Figure 1:
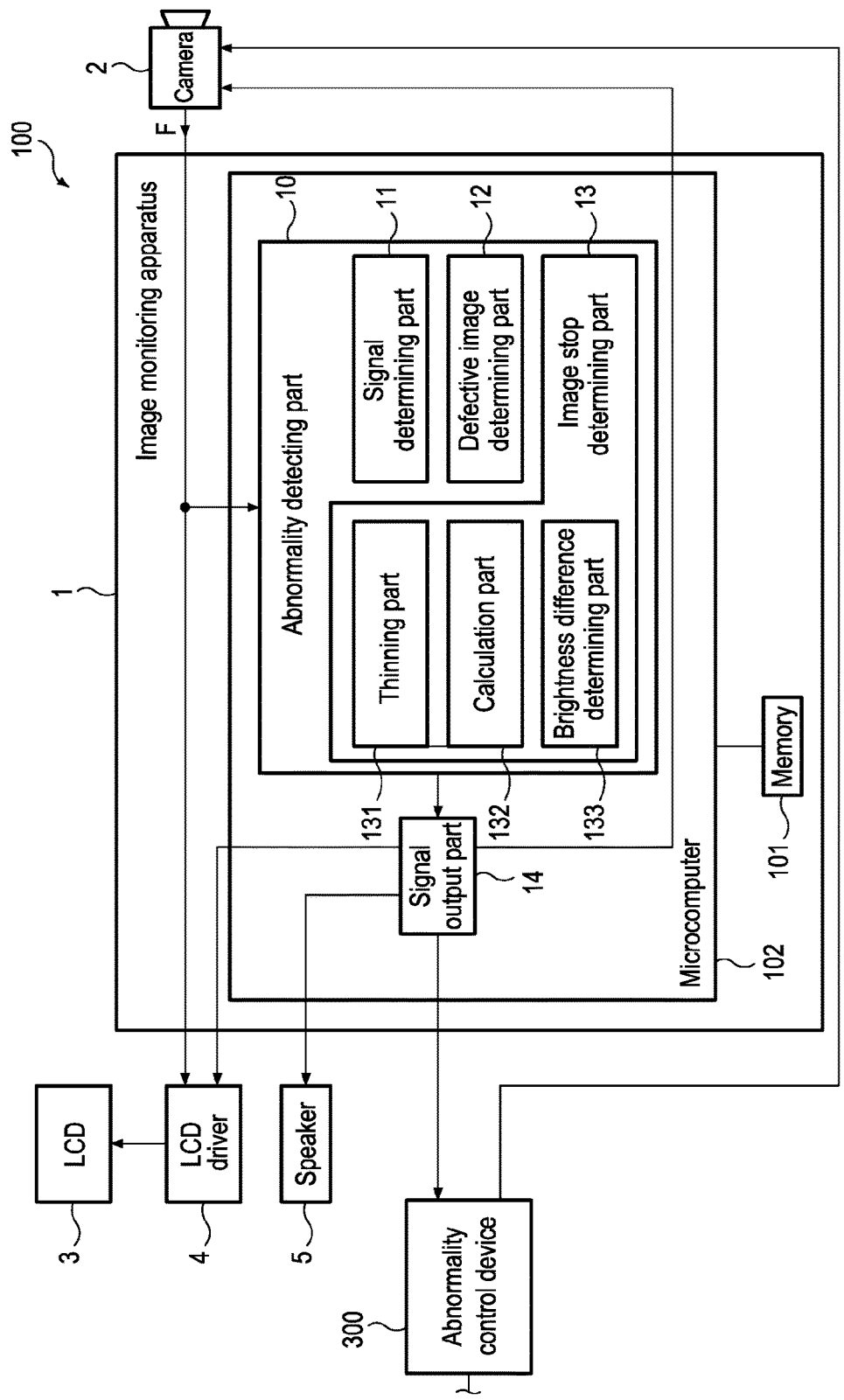
FIG. 1 is a block diagram illustrating a configuration example of an image display system equipped in a vehicle.

FIG. 1 is a block diagram illustrating a configuration example of an image display system 100. The image display system 100 of this configuration example includes an image monitoring apparatus 1, a camera 2, a liquid crystal display (LCD) 3, an LCD driver 4, and a speaker 5, and is connected to an abnormality control device 300. The abnormality control device 300 performs a predetermined processing based on an abnormality detection signal, which will be described later, output from the image monitoring apparatus 1. Further, the image monitoring apparatus 1 is not limited to the example of FIG. 1 but may be embedded in the camera 2 or the LCD driver 4. In addition, the LCD driver 4 and the speaker 5 may be embedded in the same device together with the LCD 3.

The image monitoring apparatus 1 detects an abnormal output from the camera 2 based on frame data F input from the camera 2 to the LCD device 4 and outputs an abnormality detection signal. Additional components of the image monitoring apparatus 1 will be described later.

The camera 2 is an imaging device for outputting the frame data F having captured image data. The frame data F conforms to, for example, an ITU-R BT. 656 standard, and is output from the camera 2 to the LCD driver 4 through the image monitoring apparatus 1. Further, the camera 2 performs an operation based on a control signal output from the abnormality control device 300 according to an input of the abnormality detection signal or an abnormality flag to be described below. For example, the camera 2 may stop imaging or turn off its power and enter an operation stop state.

The LCD 3 is an example of a display device. The LCD driver 4 is an example of a display driving device that drives and controls the LCD 3 and displays the frame data F on the LCD 3. The speaker 5 is an example of a sound output device. The LCD driver 4 and the speaker 5 perform a notification based on an input of the abnormality detection signal. For example, the LCD driver 4 controls display of the LCD 3 according to an input of the abnormality detection signal and displays an indication that the camera 2 itself or an image captured by the camera 2 is abnormal, on the LCD 3. When the abnormality detection signal is input, for example, the speaker 5 outputs a predetermined sound. Further, the output sound may be an alarm sound or voice guidance in a human language to inform about an abnormality in the camera 2 itself or the image captured by the camera 2.

Next, the additional components of the image monitoring apparatus 1 will be descried. The image monitoring apparatus 1 includes a memory 101 and a microcomputer 102. The memory 101 is a storage medium that non-temporarily stores information even when the power supply is stopped. For example, the memory 101 stores various programs and control information used in the image monitoring apparatus 1 (in particular, the microcomputer 102).

The microcomputer 102 is a control part that controls each component of the image monitoring apparatus 1 using the programs, control information, and the like stored in the memory 101. The microcomputer 102 includes an abnormality detecting part 10 and a signal output part 14.

The abnormality detecting part 10 detects an abnormal output from the camera 2 based on the frame data F input to the LCD driver 4, and when an abnormal output is detected, the abnormality detecting part 10 sets an abnormality flag to "True". Further, when an abnormal output is not detected, the abnormality detecting part 10 sets the abnormality flag to "False". The abnormality detecting part 10 includes a signal determining part 11, a defective image determining part 12, and an image stop determining part 13.

The signal determining part 11 determines whether the frame data F output from the camera 2 conforms to a standard of a format of the frame data F. For example, the signal determining part 11 determines a synchronization signal included in the frame data F, the number of pixels arranged in a horizontal direction and a vertical direction of an image, and the like. When the frame data F does not conform to the standard of the format, the signal determining part 11 detects an abnormal output from the camera 2 and sets the abnormality flag to "True". In this manner, the signal determining part 11 may detect an abnormality of a signal that transmits the frame data F, or the like.

The defective image determining part 12 determines whether a range in which the image is not normally captured by the camera 2 is equal to or greater than a predetermined range. Therefore, the defective image determining part 12 creates a brightness histogram of the frame data F at a predetermining timing and detects an abnormal output from the camera 2 based on the brightness histogram. For example, the defective image determining part 12 detects a peak of the brightness histogram and determines whether a maximum brightness of the detected peak is a lower limit brightness threshold value BL or less or is an upper limit brightness threshold value BH or more. When the maximum brightness is the lower limit brightness threshold value BL or less or is the upper limit brightness threshold value BH or more, the defective image determining part 12 determines whether a maximum value of a frequency of the peak exceeds a predetermined threshold value, and when the maximum value of the frequency of the peak exceeds the predetermined threshold value, the defective image determining part 12 detects an abnormal output from the camera 2. In this manner, the defective image determining part 12 may detect an output of an image with many extremely dark pixels (a so-called blackened image), an output of an image with many pixels which lose gradation due to excessive brightness (a so-called whitened image), and the like. Thus, the defective image determining part 12 may determine whether the image of the frame data F is abnormal in at least a portion of the image capture range of the camera 2, and detect an abnormal output from the camera 2.

Figure 2A:
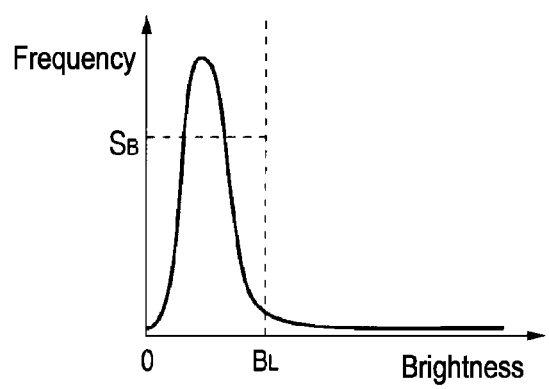
FIG. 2A is a view illustrating an example of a brightness histogram having a peak in a low brightness region of a lower limit brightness threshold value or less.
Figure 2B:
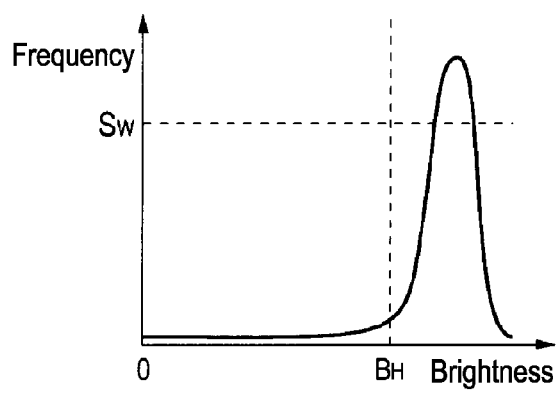
FIG. 2B is a view illustrating an example of a brightness histogram having a peak in a high brightness region of an upper limit brightness threshold value or more.

FIGS. 2A and 2B are graphs illustrating examples of the brightness histograms created by the defective image determining part 12. FIG. 2A is an example of a brightness histogram having a peak in a low brightness region of a lower limit brightness threshold value BL or less. FIG. 2B is an example of a brightness histogram having a peak in a high brightness region of an upper limit brightness threshold value BH or more. In FIG. 2A, the maximum value of a frequency of the peak of the lower limit brightness threshold value BL or less exceeds a threshold value SB. Thus, in the image of the frame data F, an image capture range, which is blackened and difficult to be recognized, is widened and becomes equal to or greater than a range corresponding to the threshold value SB. Further, in FIG. 2B, the maximum value of frequency in the peak of the upper limit brightness threshold value BH or more exceeds a threshold value SW. Thus, in the image of the frame data F, an image capture range, which is whitened and difficult to recognize, is widened and becomes equal to or greater than a range corresponding to the threshold value SW. In these cases, the defective image determining part 12 determines that the image in at least a portion of the image capture range of the camera 2 is defective and an output from the camera 2 is abnormal. Further, the threshold values SB and SW may be the same or different.

The image stop determining part 13 determines whether the output of the frame data F from the camera 2 is stopped, based on frame data F1 output from the camera 2 at a predetermined time and frame data F2 output from the camera 2 when a predetermined period of time elapses from the predetermined time. When the output of the frame data F is stopped, the image stop determining part 13 detects an abnormal output. In this manner, stoppage (i.e., output of a still image) or the like of output of an image captured by the camera 2 can be detected.

Further, the image stop determining part 13 includes a thinning part 131, a calculation part 132, and a brightness difference determining part 133.

Figure 3:
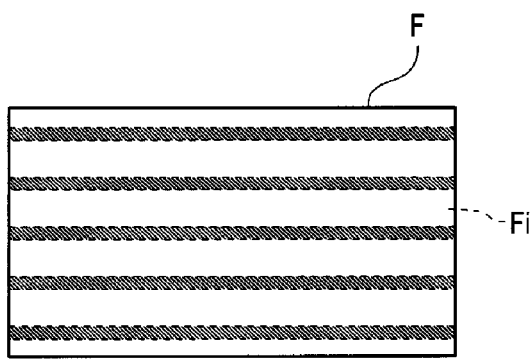
FIG. 3 is a view illustrating an example of thinning of frame data.

The thinning part 131 performs a process of thinning on the frame data F. FIG. 3 illustrates an example of thinning of the frame data F. As illustrated in FIG. 3, the thinning is a process of thinning data of a pixel row Fi arranged in a horizontal direction in the frame data F1, F2, etc. in the unit of a predetermined number of rows at an interval of predetermined rows. Whether or not the thinning part 131 performs the corresponding thinning may be arbitrarily set according to updating of configuration information stored in the memory 101, or the like.

The calculation part 132 calculates a brightness difference with respect to each color in each pixel between the frame data F1 and F2. For example, the calculation part 132 calculates a brightness difference in red R, green G, and blue B. Further, a method of calculating a brightness difference by the calculation part 132 may be arbitrarily employed. For example, the calculation part 132 calculates brightness differences with respect to all the pixels included in each of the frame data F1 and F2.

Figure 4:
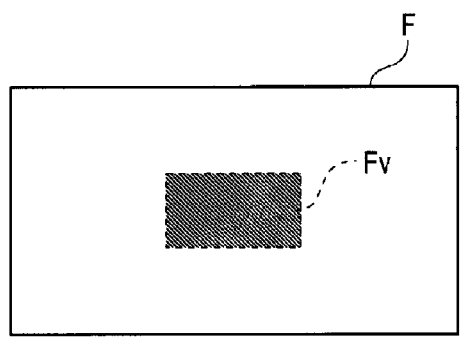
FIG. 4 is a view illustrating an example of pixels of a partial region used for calculating a brightness difference.

In addition, the calculation part 132 calculates a brightness difference with respect to each color in each pixel within a partial region Fv of the frame data F1 and F2. FIG. 4 is a view illustrating an example of pixels of the partial region Fv used for calculating a brightness difference. The pixels of the partial region Fv may be arbitrarily set according to an operational input or the like, and as illustrated in FIG. 4, the partial region may be a central region of the frame data F or may be a region designated by an operational input. By calculating a brightness difference in each pixel of the partial region Fv, it is possible to easily calculate the brightness difference and to reduce a load applied to the calculation part 132.

Further, when thinning is performed on each of the frame data F1 and F2 by the thinning part 131, the calculation part 132 calculates a brightness difference with respect to each color of each pixel of the frame data F1 and F2 after the thinning (see FIG. 3). By reducing the number of pixels for calculating a brightness difference through the thinning, it is possible to easily calculate the brightness difference and to reduce a load applied to the calculation part 132.

When all the brightness differences with respect to colors calculated by the calculation part 132 are within a predetermined level, the brightness difference determining part 133 determines that the output of the frame data F is stopped. For example, the brightness difference determining part 133 determines whether all the brightness differences with respect to colors in all the pixels calculated by the calculation part 132 are equal to or lower than a predetermined threshold value. When all the brightness differences with respect to colors in all the pixels are equal to or lower than the threshold value, the brightness difference determining part 133 determines that the frame data F2 is an image which is the same as the frame data F1 and the output of the frame data F is stopped due to imaging stoppage of the camera 2. The threshold value is, for example, a value based on the brightness difference with respect to each color resulting from a fluctuation component of brightness of each pixel of the frame data F, and is provided for each color. In other words, since fluctuation occurs in the brightness of the frame data F due to an imaging environment of the camera 2 and noise received from the camera 2 itself, a brightness difference resulting from the fluctuation component is inevitably generated in each pixel among the plurality of frame data F output at different timings. Thus, when a brightness difference calculated by the calculation part 132 is equal to or smaller than a threshold value larger than the brightness difference resulting from the fluctuation component, it may be determined that the frame data F2 is an image which is the same as the frame data F1. Further, the threshold values of brightness differences with respect to colors may be different from each other or the same.

When the abnormality flag is "True", the signal output part 14 outputs an abnormality detection signal to the camera 2, the LCD driver 4, the speaker 5, and the abnormality control device 300. Further, the abnormality detection signal is not limited to the example but may be output to at least one of the camera 2, the LCD driver 4, the speaker 5, and the abnormality control device 300.

According to the image monitoring apparatus 1 of the aforementioned configuration example, when an abnormal output is detected, an abnormality detection signal is output and a processing according to the abnormality detection signal is performed. For example, when an abnormal output from the camera 2 is detected, at least one of a notification operation according to the detection of the abnormal output and a feedback process of the detection of the abnormal output may be performed. In addition, the notification operation may be a display on the LCD 3, a sound output from the speaker 5 or the like, and the feedback process may be an operation such as stopping imaging of the camera 2 or power OFF, a predetermined process in the abnormality control device 300, or the like. Thus, it is possible to reduce or prevent misjudgment resulting from an abnormal output from the camera 2.

Further, in the present embodiment, the abnormality detecting part 10 of the image monitoring apparatus 1 includes the signal determining part 11, the defective image determining part 12, and the image stop determining part 13, but the present disclosure is not limited thereto and the abnormality detecting part 10 may include one or two of the signal determining part 11, the defective image determining part 12, and the image stop determining part 13. Further, in some embodiments, when the abnormality detecting part 10 includes at least two of the signal determining part 11, the defective image determining part 12, and the image stop determining part 13, priority may be set for each processing in the at least two determining parts. In this manner, when an abnormal output from the camera 2 is detected by the first determining part having higher priority of the at least two determining parts, the processing by the second determining part having lower priority than that of the first determining part may not be executed.

For example, when the abnormality detecting part 10 includes the signal determining part 11, the defective image determining part 12, and the image stop determining part 13 as illustrated in FIG. 1, the priority of processing in the signal determining part 11 may be the highest and the priority of processing in the image stop determining part 13 may be the lowest. In this case, when an abnormal signal is detected by the signal determining part 11, the processing in the defective image determining part 12 and the processing in the image stop determining part 13 are not performed and an abnormality detection signal is output from the signal output part 14. Further, when an abnormal signal is not detected by the signal determining part 11, the processing in the defective image determining part 12 is performed. When an abnormal output from the camera 2 is detected based on a brightness histogram in the defective image determining part 12, the processing in the image stop determining part 13 is not performed and an abnormality detection signal is output from the signal output part 14. In addition, when an abnormal output is not detected by the defective image determining part 12, the processing in the image stop determining part 13 is performed. When the processing of detecting an abnormal output from the camera 2 is executed in this manner, it is possible to reduce a load applied to the abnormality detection unit 10.

<Applications of the Present Disclosure>

Figure 5:
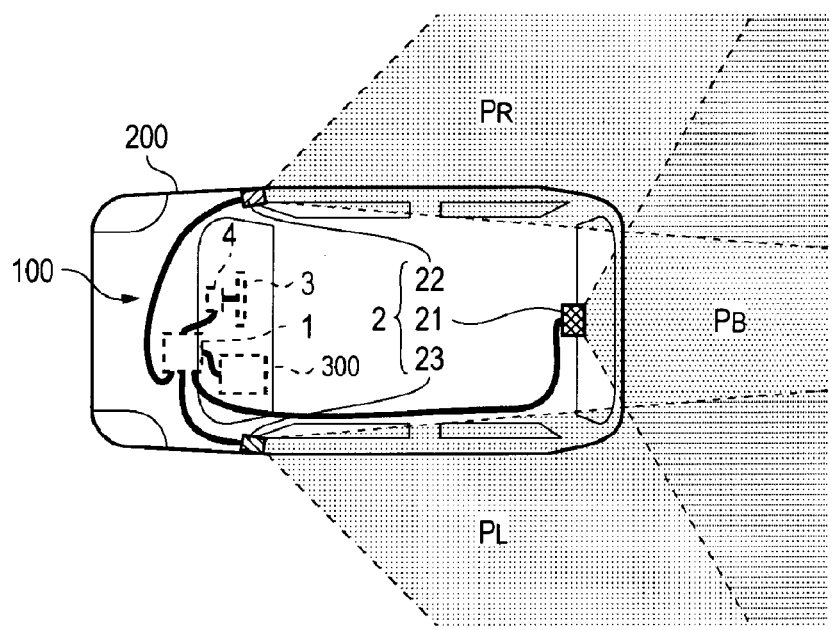
FIG. 5 is a top view of a vehicle equipped with an image display system.
Figure 6:
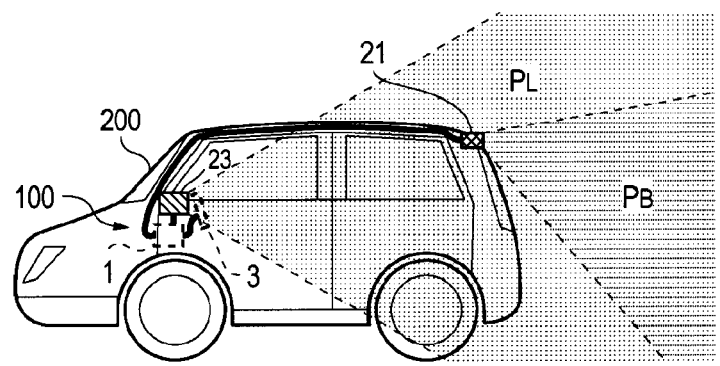
FIG. 6 is a left side view of a vehicle equipped with an image display system.

Next, applications of the present disclosure will be described. FIGS. 5 and 6 are views illustrating an application of the present disclosure, and illustrate that a configuration example in which the image display system 100 is equipped in a vehicle 200. FIG. 5 is a top view of the vehicle 200 equipped with the image display system 100. FIG. 6 is a left side view of the vehicle 200 equipped with the image display system 100. In the application of FIGS. 5 and 6, the aforementioned image display system 100 is used as an electronic mirror device which allows a driver to visually recognize a situation at the rear of the vehicle 200. Further, in the present application, at least one of the image monitoring apparatus 1 and the abnormality control device 300 is, for example, a portion of an engine control part (ECU) (not shown) of the vehicle 200.

The camera 2 of the image display system 100 includes a rear camera 21, a right camera 22, and a left camera 23. The rear camera 21 images the rear center portion of the vehicle 200 and outputs frame data F of an image FB of the rear center portion. The right camera 22 images the rear right side of the vehicle 200 and outputs frame data F of an image PR of the rear right side. The left camera 23 images the rear left side of the vehicle 200 and outputs frame data F of an image PL of the rear left side. Further, the camera 2 is not limited to the example but may be configured to image at least one of the central rear portion, the left rear side, and the right rear side of the vehicle 200. That is, the camera 2 may include at least one of the rear camera 21, the right camera 22, and the left camera 23.

Figure 7:
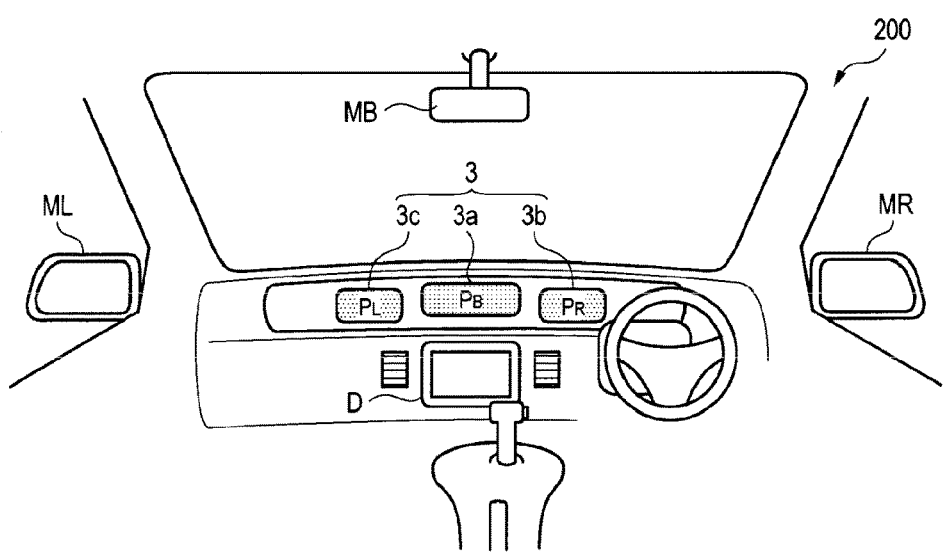
FIG. 7 is a conceptual diagram illustrating a display example of an image based on frame data of each of the cameras placed in a vehicle.

FIG. 7 is a conceptual diagram illustrating a display example of the images PB, PR, and PL based on the frame data F of each of the cameras 21, 22, and 23 placed in the vehicle 200. FIG. 7 illustrates the interior of the vehicle 200. Three LCDs 3a to 3c are installed on a dashboard of the vehicle 200, in addition to a display D used for car navigation or the like. The LCD driver 4 displays the image PB based on the frame data F input from the rear camera 21, on the LCD 3a. Similarly, the image PR based on the frame data F input from the right camera 22 is displayed on the LCD 3b. The image PL based on the frame data F input from the left camera 23 is displayed on the LCD 3c.

Further, the arrangement of the LCDs 3a to 3c is not limited to the example of FIG. 7. The LCDs 3a to 3c may also be installed in places other than the dashboard. For example, the LCDa may be placed near the back mirror MB or in the same position as the back mirror MB. The LCDs 3b and 3c may be placed near side mirrors MR and ML.

Figure 8:
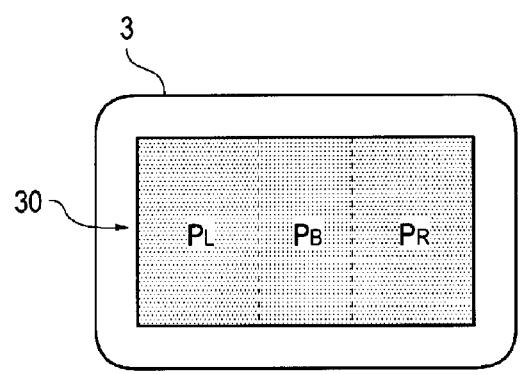
FIG. 8 is a view illustrating another display example of an image based on frame data of each of the cameras placed in a vehicle.

The images PB, PR, and PL may also be displayed on a single display screen 30. FIG. 8 illustrates another display example of the images PB, PR, and PL based on the frame data F of each of the cameras 21 to 23 placed in the vehicle 200. As illustrated in FIG. 8, the LCD driver 4 displays the image PB of the central rear of the vehicle 200 at the center of the display screen 30, displays the image PR of the right rear side of the vehicle 200 on the right of the display screen 30, and displays the image PL of the left rear side of the vehicle 200 on the left of the display screen 30. Here, in FIG. 8, the LCD 3 on which the images PB, PR, and PL are displayed may be a display D used in a car navigation, and the like, or may be a display device different from the display D.

Subsequently, in the image monitoring apparatus 1 equipped in the vehicle 200, the abnormality detecting part 10 detects an abnormal output from each of the cameras 21 to 23 based on the frame data F input to the LCD driver 4 from each of the cameras 21 to 23. An abnormality flag corresponding to the cameras 21 to 23 that output the frame data F based on which the abnormal output is detected is set to "True".

Further, the detection of an abnormal output by the abnormality detecting part 10 may be performed according to an operation situation of the vehicle 200. The abnormality detecting part 10 detects an abnormal output from the camera 2 based on operation situation information (driving/stop of the vehicle 200, or the like) obtained by the microcomputer 102 from the ECU. For example, when the vehicle 200 is driving, the defective image determining part 12 and the image stop determining part 13 may perform detection of an abnormal output, and when the vehicle 200 is stopped, the defective image determining part 12 and the image stop determining part 13 may stop detecting the abnormal output. The signal determining part 11 may also switch performing/stopping detection of an abnormal output according to the operation situation information or may perform detection of an abnormal output, regardless of an operational situation of the vehicle 200.

The signal output part 14 outputs an abnormality detection signal of the cameras 21 to 23 for which the abnormality flag is set to "True" to at least one of the camera 2, the LCD driver 4, the speaker 5, and the abnormality control device 300.

Each of the cameras 21 to 23 performs an operation based on an input of an abnormality detection signal or a control signal output from the abnormality control device 300 according to an abnormality flag. For example, when an abnormal output is detected, the cameras 21 to 23 may stop imaging or may be turned off and enter an operation stop state.

The LCD driver 4 may perform notification by the LCD 3 according to an input of an abnormality detection signal. For example, when the abnormality detection signal is input, the LCD driver 4 displays on the LCD 3 that the images PB, PR, and PL of the cameras 21 to 23 for which the abnormality flag is set to "True" are abnormal.

The speaker 5 performs notification based on a sound output according to an input of the abnormality detection signal. For example, when the abnormality detection signal is input, the speaker 5 may output a predetermined voice or output voice guidance in a human language notifying abnormality of the images PB, PR, and PL of the cameras 21 to 23 for which the abnormality flag is set to "True".

Further, the notification by the LCD driver 4 and the speaker 5 may be performed when the abnormal output is detected from at least one of the rear camera 21, the right camera 22 and the left camera 23, or may be performed in each of the cameras 21 to 23 for which the abnormal output is detected.

The abnormality control device 300 controls an operation of the vehicle 200 according to an input of the abnormality detection signal and, for example, limits a maximum speed of the vehicle 200, reduces the speed of the vehicle 200, or stops driving of the vehicle 200, while the vehicle 200 is driving. In this manner, since an operation for securing safety of the vehicle 200 is performed according to detection of an abnormal output of the camera 2, it is possible to reduce or prevent a possibility that the driver of the vehicle 200 may cause an accident due to the driver's erroneous recognition of the situation at the rear of the vehicle 200.

Furthermore, control of the operation of the vehicle 200 by the abnormality control device 300 may be performed when an abnormality detection signal regarding at least one of the rear camera 21, the right camera 22, and the left camera 23 is input or may be performed when an abnormality detection signal regarding all of the plurality of cameras 21 to 23 is input.

The embodiment of the present disclosure has been described above. It is also to be understood by those skilled in the art that the aforementioned embodiment is illustrative, and various modifications may be made to combinations of their respective compositions and processes, and are within the scope of the present disclosure.

For example, in the aforementioned embodiment, at least a portion or all of the functional components of the microcomputer 102 may be realized by physical components (for example, an electric circuit, element, device, etc.). Further, the microcomputer 102 may be realized by a physical logic circuit.

The present disclosure described herein can be used, for example, in a vehicle, etc. equipped with an image display system for displaying images on a display device based on an image output from an imaging device.

According to the present disclosure in some embodiments, it is possible to provide an image monitoring apparatus, an image display system, and a vehicle, which are capable of reducing or preventing misjudgment resulting from an abnormal output from an imaging device.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An image monitoring apparatus, comprising:
an abnormality detecting part configured to detect an abnormal output from an imaging device based on frame data input to a display driving device that displays the frame data output from the imaging device on a display device; and
a signal output part configured to output an abnormality detection signal when the abnormal output is detected,
wherein the abnormality detecting part comprises at least two of a signal determining part, a defective image determining part, and an image stop determining part,
the signal determining part is configured to determine whether the frame data conforms to a format standard of the frame data to detect the abnormal output when the frame data does not conform to the standard, the defective image determining part is configured to detect the abnormal output based on a brightness histogram of the frame data, the image stop determining part is configured to determine whether the output of the frame data in the imaging device is stopped based on a first frame data output from the imaging device at a first time and a second frame data output from the imaging device at a second time after a predetermined period of time from the first time to detect the abnormal output when the output is stopped, a priority is set in each processing in the at least two of the determining parts, and when the abnormal output is detected by a first determining part in the at least two of the determining parts, the processing by a second determining part having a priority lower than a priority of the first determining part is not performed.

2. The apparatus of claim 1, wherein the image stop determining part comprises:
    a calculation part configured to calculate a brightness difference with respect to each color of each pixel of the first frame data and the second frame data; and
    a brightness difference determining part configured to determine that the output of the frame data is stopped when all the brightness differences with respect to colors are within a predetermined level.

3. The apparatus of claim 2, wherein the calculation part is configured to calculate the brightness difference with respect to each color of each pixel within a partial region of the first frame data and the second frame data.

4. The apparatus of claim 2, wherein the image stop determining part further comprises a thinning part configured to perform a process of thinning on data of pixel rows arranged in a horizontal direction of the first frame data and the second frame data in a unit of a predetermined number of rows at an interval of predetermined rows, and
    the calculation part is configured to calculate the brightness difference with respect to each color of each pixel of the first frame data and the second frame data after the process of thinning is performed.

5. An image display system, comprising:
    the image monitoring apparatus of claim 1;
    the imaging device; and
    the display driving device configured to display the frame data output from the imaging device on the display device.

6. A vehicle, comprising:
    the image monitoring apparatus of claim 1;
    the imaging device; and
    the display driving device configured to display the frame data output from the imaging device on the display device,
    wherein the imaging device is configured to image at least one of a central rear, a left rear, and a right rear of the vehicle.

7. The vehicle of claim 6, further comprising the display device configured to perform a predetermined display operation based on the abnormality detection signal.

8. The vehicle of claim 6, further comprising a sound output device configured to output a predetermined sound based on the abnormality detection signal.

9. An image monitoring apparatus, comprising:
    a controller configured to:
        detect an abnormal output from a camera based on frame data input to a display driver that displays the frame data output from the camera on a display; and
        output an abnormality detection signal when the abnormal output is detected,
    wherein when the abnormal output is detected, the controller is further configured to perform at least two processes of:
        determining whether the frame data conforms to a format standard of the frame data to detect the abnormal output when the frame data does not conform to the standard;
        detecting the abnormal output based on a brightness histogram of the frame data; and
        determining whether the output of the frame data in the camera is stopped based on a first frame data output from the camera at a first time and a second frame data output from the camera at a second time after a predetermined period of time from the first time to detect the abnormal output when the output is stopped,
    wherein a priority is set in each processing in the at least two processes, and
    wherein when the abnormal output is detected by a first process in the at least two processes, the processing by a second process having a priority lower than a priority of the first process is not performed.

10. The apparatus of claim 9, wherein the controller is further configured to:
    calculate a brightness difference with respect to each color of each pixel of the first frame data and the second frame data; and
    determine that the output of the frame data is stopped when all the brightness differences with respect to colors are within a predetermined level.

11. The apparatus of claim 10, wherein the controller is further configured to calculate the brightness difference with respect to each color of each pixel within a partial region of the first frame data and the second frame data.

12. The apparatus of claim 10, wherein the controller is further configured to:
    perform a process of thinning on data of pixel rows arranged in a horizontal direction of the first frame data and the second frame data in a unit of a predetermined number of rows at an interval of predetermined rows; and
    calculate the brightness difference with respect to each color of each pixel of the first frame data and the second frame data after the process of thinning is performed.

13. An image display system, comprising:
    the image monitoring apparatus of claim 9;
    the camera; and
    the display driver configured to display the frame data output from the camera on the display.

14. A vehicle, comprising:
    the image monitoring apparatus of claim 9;
    the camera; and
    the display driver configured to display the frame data output from the camera on the display,
    wherein the camera is configured to image at least one of a central rear, a left rear, and a right rear of the vehicle.

15. The vehicle of claim 14, further comprising the display configured to perform a predetermined display operation based on the abnormality detection signal.

16. The vehicle of claim 14, further comprising a speaker configured to output a predetermined sound based on the abnormality detection signal.

\* \* \* \* \*